US010109378B2

(12) United States Patent
Snead

(10) Patent No.: US 10,109,378 B2
(45) Date of Patent: Oct. 23, 2018

(54) METHOD FOR FABRICATION OF FULLY CERAMIC MICROENCAPSULATION NUCLEAR FUEL

(71) Applicant: Ultra Safe Nuclear Corporation, Los Alamos, NM (US)

(72) Inventor: Lance Lewis Snead, Knoxville, TN (US)

(73) Assignee: ULTRA SAFE NUCLEAR CORPORATION, Los Alamos, NM (US)

( * ) Notice: Subject to any disclaimer, the term of this patent is extended or adjusted under 35 U.S.C. 154(b) by 347 days.

(21) Appl. No.: 15/218,245

(22) Filed: Jul. 25, 2016

(65) Prior Publication Data

US 2017/0025192 A1 Jan. 26, 2017

Related U.S. Application Data

(60) Provisional application No. 62/196,975, filed on Jul. 25, 2015.

(51) Int. Cl.
*G21C 3/04* (2006.01)
*G21C 3/07* (2006.01)
(Continued)

(52) U.S. Cl.
CPC ............ *G21C 3/04* (2013.01); *C04B 35/5158* (2013.01); *C04B 35/565* (2013.01); *G21C 3/07* (2013.01);
(Continued)

(58) Field of Classification Search
CPC ....................................................... G21C 3/07
See application file for complete search history.

(56) References Cited

U.S. PATENT DOCUMENTS 2,950,238 A 8/1960 Nicholson
3,826,754 A 7/1974 Grossman
(Continued)

FOREIGN PATENT DOCUMENTS

JP 2006-504086 A 2/2006
JP 2006-234405 A 9/2006
(Continued)

OTHER PUBLICATIONS

International Search Report and Written Opinion dated Dec. 8, 2016 issued in corresponding International Patent Application No. PCT/US2016/043897 (10 pages).
(Continued)

*Primary Examiner* — Peter F Godenschwager
(74) *Attorney, Agent, or Firm* — Drinker Biddle & Reath LLP

(57) ABSTRACT

Currently, the commercial fuel of choice, $UO_2$-zircaloy, is economical due to an established and simple fabrication process. However, the alternatives to the $UO_2$-zircaloy that may improve on system safety are sought. The fully ceramic microencapsulated (FCM) fuel system that is potentially inherently safe fuel and is an improvement on the $UO_2$-zircaloy system is prohibitively expensive because of the known methods to produce it. Disclosed herein is a new production route and fixturing that produces identical or superior FCM fuel consistent with mass production by providing a plurality of tristructural-isotropic fuel particles; mixing the plurality of tristructural-isotropic fuel particles with ceramic powder to form a mixture; placing the mixture in a die; and applying a current to the die so as to sinter the mixture by direct current sintering into a fuel element.

16 Claims, 3 Drawing Sheets

(51) Int. Cl.
- *C04B 35/565* (2006.01)
- *G21C 3/20* (2006.01)
- *G21C 3/62* (2006.01)
- *C04B 35/515* (2006.01)

(52) U.S. Cl.
CPC ............... *G21C 3/20* (2013.01); *G21C 3/62* (2013.01); *C04B 2235/3217* (2013.01); *C04B 2235/3225* (2013.01); *C04B 2235/3227* (2013.01); *C04B 2235/52* (2013.01); *C04B 2235/5445* (2013.01); *C04B 2235/5454* (2013.01); *C04B 2235/602* (2013.01); *C04B 2235/6562* (2013.01); *C04B 2235/666* (2013.01); *C04B 2235/77* (2013.01); *C04B 2235/79* (2013.01); *C04B 2235/94* (2013.01); *G21C 2003/045* (2013.01); *G21Y 2002/50* (2013.01); *G21Y 2004/30* (2013.01); *Y02E 30/40* (2013.01)

(56) References Cited

U.S. PATENT DOCUMENTS

| | | | |
|---|---|---|---|
| 3,907,948 | A | 9/1975 | Gyarmati et al. |
| 4,297,169 | A | 10/1981 | Grubb |
| 4,597,936 | A | 7/1986 | Kaae |
| 4,683,114 | A | 7/1987 | Ho et al. |
| 4,707,330 | A | 11/1987 | Ferrari |
| 4,869,867 | A | 9/1989 | Lay et al. |
| 4,869,886 | A | 9/1989 | Saiki et al. |
| 4,963,758 | A | 10/1990 | Noren et al. |
| 4,978,480 | A | 12/1990 | Stansfield et al. |
| 5,268,947 | A | 12/1993 | Bastide et al. |
| 5,805,657 | A | 9/1998 | Heubeck |
| 6,162,543 | A | 12/2000 | Dubots et al. |
| 8,475,747 | B1 | 7/2013 | Johnson et al. |
| 9,224,506 | B2 | 12/2015 | Broli et al. |
| 9,299,464 | B2 | 3/2016 | Venneri et al. |
| 2003/0113447 | A1 | 6/2003 | Sherwood et al. |
| 2005/0195933 | A1 | 9/2005 | Dorr et al. |
| 2006/0039524 | A1 | 2/2006 | Feinroth et al. |
| 2008/0159464 | A1 | 7/2008 | Futterer et al. |
| 2009/0032178 | A1 | 2/2009 | Feinroth |
| 2010/0290578 | A1 | 11/2010 | Farrell et al. |
| 2010/0296621 | A1 | 11/2010 | Broli et al. |
| 2011/0080987 | A1 | 4/2011 | Watanabe et al. |
| 2011/0091004 | A1 | 4/2011 | Farmer et al. |
| 2011/0317794 | A1 | 12/2011 | Venneri et al. |
| 2012/0140867 | A1 | 6/2012 | Venneri et al. |
| 2014/0220230 | A1 | 8/2014 | Kuczynski |
| 2015/0170767 | A1 | 6/2015 | Venneri |
| 2015/0221398 | A1 | 8/2015 | Subhash et al. |
| 2015/0310948 | A1 | 10/2015 | Venneri et al. |
| 2017/0287575 | A1 | 10/2017 | Venneri |
| 2017/0287577 | A1 | 10/2017 | Venneri |
| 2017/0301415 | A1 | 10/2017 | Venneri |

FOREIGN PATENT DOCUMENTS

| | | |
|---|---|---|
| JP | 2007-010472 A | 1/2007 |
| JP | 2007-086024 A | 4/2007 |
| JP | 2010-512529 A | 4/2010 |
| KR | 10-2013-0102766 A | 9/2013 |
| WO | WO-2008/071676 A1 | 6/2008 |
| WO | WO-2009/058185 A2 | 5/2009 |
| WO | WO-2010/086431 A1 | 8/2010 |
| WO | WO-2012/129677 A1 | 10/2012 |
| WO | WO-2014/028731 A1 | 2/2014 |

OTHER PUBLICATIONS

International search report and the written opinion dated Aug. 8, 2017 issued in corresponding international patent application No. PCT/US2017/019887 (13 pages).

International Search Report and Written Opinion dated Mar. 13, 2017 in corresponding International patent application No. PCT/US2016/063975 (13 pages).

International Search Report and Written Opinion dated Jul. 11, 2017 issued in corresponding International patent application No. PCT/US2017/024794 (15 pages).

International Preliminary Report on Patentability dated Jun. 4, 2013, in International Patent Application No. PCT/US2011/062560, filed Nov. 30, 2011.

K. D. Weaver et al., Gen IV Nuclear Energy Systems: Gas-Cooled Fast Reactor (GFR), FY-04 Annual Report, Sep. 2004, Idaho National Engineering and Environmental Laboratory, INEEL/EXT-04-02361.

M. K. Meyer et al., Fuel Development for Gas-Cooled Fast Reactors, Journal of Nuclear Materials, 371 (2007), pp. 281-287.

Sterbentz, J.W. et al., "Reactor Physics Parametric and Depletion Studies in Support of TRISO Particle Fuel Specification for the Next Generation Nuclear Plant," INEEL/EXT-04-02331, Sep. 2004, Idaho National Engineering and Environmental Laboratory, Idaho Falls, Idaho.

TRISO-Coated Particle Fuel Phenomenon Indentification and Ranking Tables (PIRTs) for Fission Product Transport Due to Manufacturing, Operations, and Accidents, NUREG-6844, vol. 1, Jul. 2004, U.S. Nuclear Regulatory Commission, Washington, DC.

TRISCO-Coated Particle Fuel Phenomenon Identification and Ranking Tables (PIRTs) for Fission Product Transport Due to Manufacturing, Operations, and Accidents, Appendices A through D, NUREG-6844, vol. 2, Jul. 2004, U.S. Nuclear Regulatory Commission, Washington, DC.

TRISCO-Coated Particle Fuel Phenomenon Identification and Ranking Tables (PIRTs) for Fission Product Transport Due to Manufacturing, Operations, and accidents, Appendices E through I, NUREG-6844, vol. 3, Jul. 2004, U.S. Nuclear Regulatory Commission, Washington, DC.

U.S. Office Action dated Jan. 8, 2014 that issued in U.S. Appl. No. 12/959,115 including Double Patenting Rejections on pp. 3-5.

METHOD FOR FABRICATION OF FULLY CERAMIC MICROENCAPSULATION NUCLEAR FUEL

CROSS-REFERENCE TO RELATED APPLICATIONS

This application claims benefit to U.S. provisional application No. 62/196,975 filed on Jul. 25, 2015, the entire contents of which is incorporated by reference herein.

TECHNICAL FIELD

The present disclosure relates to an improved method of forming improved nuclear fission fuel. More specifically, the present disclosure relates to a method for mass producing an accident tolerant fully ceramic microencapsulated fuel.

BACKGROUND

In the discussion of the background that follows, reference is made to certain structures and/or methods. However, the following references should not be construed as an admission that these structures and/or methods constitute prior art. Applicant expressly reserves the right to demonstrate that such structures and/or methods do not qualify as prior art.

Commercial nuclear fuel can be of many forms specific to a particular reactor type though essentially all commercial power reactors utilize uranium as the initial fissile material. The most common fuel type is the uranium oxide ($UO_2$) pellet housed within a thin zirconium alloy cladding of a light water reactor (LWR.) This fuel type is used in both LWR variants: the pressured water reactor (PWR) and the boiling water reactor (BWR) configuration. This $UO_2$ pellet is mass-produced through a conventional ceramic processing route. Once a powder of appropriate purity and enrichment is achieved it is pressed and then sintered in the presence of hydrogen and taken to final dimension by center-less grinding. A very similar process to arrive at $UO_2$ in zircaloy clad is followed for the production of the CANDU (Canada deuterium-uranium) heavy water moderated reactor fuel, though the starting powder can include natural enrichment, recycled uranium (RU), or mixed oxide (MOX). The CANDU and LWR's make up the vast majority of the present international nuclear power fleet making $UO_2$ in zircaloy clad the dominant nuclear fuel system. Arguably, the zircaloy clad of this fuel is the primary fission gas barrier in these LWR and CANDU systems.

The high-temperature Gas-Cooled Reactors (HTGR's), yet to become a significant commercial nuclear platform, whether in the prismatic or pebble-bed configuration, utilize a fuel specifically engineered as a primary barrier to fission product retention. This is achieved through engineering layers of carbon, graphite and SiC around the $UO_2$ (or other) fuel kernel such that the SiC becomes a pressure vessel. This structure, otherwise known as a TRISO (Tri-Structure Isotropic) fuel is combined with many such small spheres on the order of ~1 mm in diameter which are then compacted (pressed) into a host graphite matrix and has been used in a small number of commercial power reactors. A primary safety advantage of such a fuel is the elimination of the zircaloy cladding which can interact with the coolant under certain accident conditions.

More recently, a fuel form has been developed whereby TRISO, rather than being compacted in graphite as is the case for HTGR, is compacted within a strong and impermeable silicon carbide (SiC) matrix. This relatively new TRISO-based, SiC matrix fuel is referred to as fully ceramic microencapsulated (FCM) fuel. Intermixing a plurality of TRISO particles within such a SiC matrix results in two barriers to fission product release, significantly enhancing the safety aspects of nuclear fuel as compared with the LWR-standard $UO_2$-zircaloy or the HTGR-standard TRISO-graphite compact.

While the HTGR TRISO and FCM arguably convey safety benefits to nuclear systems both the TRISO itself and the methodology by which the FCM is processed are more complex as compared to the $UO_2$ process resulting in fuel which is either marginally more expensive, or for the case of FCM, potentially impractical for mass production. Presently, due to the relatively high temperature and pressure required for the processing of FCM, hot-pressing was the preferred method, which is not a process which lends itself to the mass-production levels required for nuclear fuel. Moreover, given the heterogeneous nature of the fuel, the centerless grinding step common to $UO_2$ and current FCM process is problematic in that exposure of the TRISO kernel is undesirable. Accordingly, there remains a need for an improved method of forming enhanced fission fuel in the form of fully ceramic microencapsulated TRISO-based fuel.

SUMMARY

It has been discovered that a process as described below can achieve mass production of a fuel that includes TRISO fully microencapsulated within a fully dense ceramic. Accordingly, the process enables mass production of improved fission fuel that contains two barriers to fission product release, and thus significantly enhancing the safety aspects of nuclear fuel as compared with other fission fuels.

One method that achieves mass production of a fuel that includes TRISO fully microencapsulated within a fully dense ceramic comprises: providing a plurality of tristructural-isotropic fuel particles; mixing the plurality of tristructural-isotropic fuel particles with ceramic powder to form a mixture; placing the mixture in a die; and applying a current to the die so as to sinter the mixture by direct current sintering into a fuel element.

In an embodiment according to the above method, the method further includes adding the mixture to a ceramic fuel sleeve prior to the step of placing the mixture within the ceramic fuel sleeve in the die.

In an embodiment according to the above method, the ceramic fuel sleeve includes silicon carbide (SiC).

In an embodiment according to any of the above methods, the ceramic fuel sleeve includes the same composition as the ceramic powder.

In an embodiment according to any of the above methods, the die includes more than one parallel opening and the method includes placing a mixture of the plurality of tristructural-isotropic fuel particles with ceramic powder in each of the openings.

In an embodiment according to any of the above methods, the die includes more than one parallel opening and the method includes placing a ceramic fuel sleeve containing a mixture of the plurality of tristructural-isotropic fuel particles with ceramic powder in each of the openings.

In an embodiment according to any of the above methods, the die comprises graphite.

In an embodiment according to any of the above methods, the fuel element has a precise outer part dimension following the sintering process, with no additional processing occurring after the sintering process to obtain the precise outer part dimension.

In an embodiment according to any of the above methods, the ceramic powder comprises silicon carbide (SiC).

In an embodiment according to any of the above methods, the ceramic powder further comprises sintering additives.

In an embodiment according to any of the above methods, the sintering additives comprise alumina or a rare earth metal oxide or a combination thereof In an embodiment according to any of the above methods, the rare earth metal oxide is yttria.

In an embodiment according to any of the above methods, the ceramic powder includes the sintering additives in an amount up to 10 weight percent of the total weight of the ceramic powder.

In an embodiment according to any of the above methods, the fuel element comprises near stoichiometric SiC.

In an embodiment according to any of the above methods, a total run time for forming the fuel element is less than an hour.

BRIEF DESCRIPTION OF THE DRAWINGS

Embodiments of the invention will now be described by way of example with reference to the accompanying drawings, of which.

DETAILED DESCRIPTION OF PARTICULAR EMBODIMENTS

The following detailed description can be read in connection with the accompanying drawings in which like numerals designate like elements.

Figure 1:
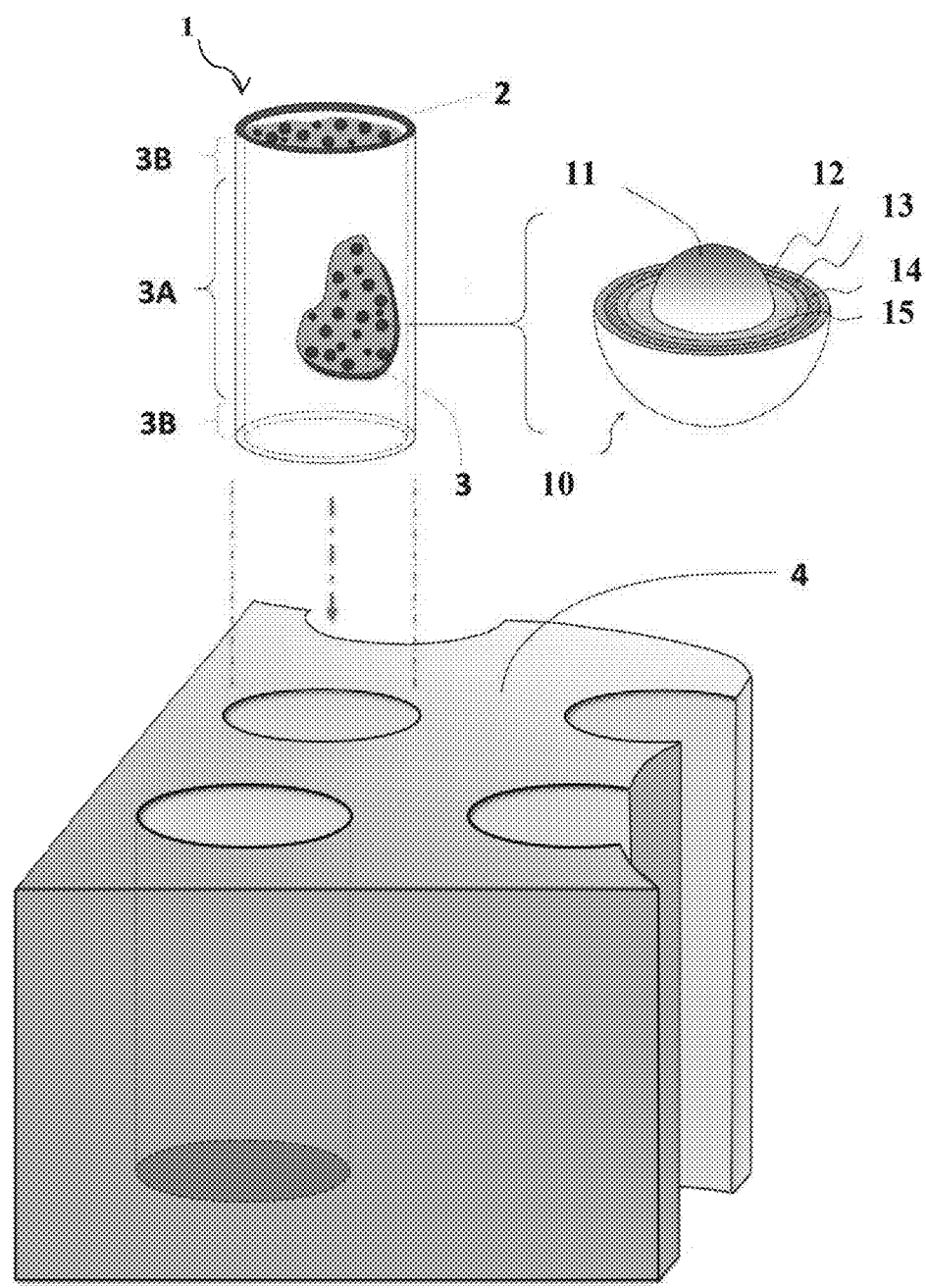
FIG. 1 is a schematic diagram illustrating FCM fuel to be processed within a multi-fuel die.

FIG. 1 is a schematic diagram illustrating the formation and processing of an FCM fuel in a multi-press die block. In FIG. 1, an unprocessed fuel element 1 includes a plurality of micro-encapsulated fuel particles 10 mixed with a ceramic matrix 3. The plurality of micro-encapsulated fuel particles 10 may be tristructural-isotropic (TRISO) fuel particles. The term "TRISO fuel particle," as used herein, refers to any type of micro fuel particle comprising a fuel kernel and one or more layers of isotropic materials surrounding the fuel kernel. By way of example only, the fuel particle 10 may have a diameter of about 1 millimeter.

In the embodiment shown in FIG. 1, the fuel particle 10 includes a fuel kernel 11 at its center. The fuel kernel may comprise fissile and/or fertile materials (e.g., uranium, plutonium, thorium, etc.) in an oxide, carbide, or oxycarbide form. In a particular embodiment, the fuel kernel 11 includes low enriched uranium (LEU) of any suitable enrichment level.

When the fuel element is used for waste mitigation and/or disposal purposes, the fuel kernel 11 may alternatively or additionally include transuranics (TRU) and/or fission products extracted or otherwise reprocessed from spent fuels.

For example, the fuel element may be used for destruction of transuranic waste generated from, for example, light water reactors or decommissioned nuclear weapons. For that purpose, the fuel element may include fuel kernels 11 formed of transuranic elements extracted from a spent fuel of a light water reactor and/or a core of a nuclear weapon. According to a particular embodiment, a fuel element formed in accordance with the described methods may be used as fuel for a light water reactor to destroy the transuranic waste while, at the same time, generating power from it.

The fuel particle 10 illustrated in FIG. 1 also includes four distinct layers coated over the fuel kernel 11, namely (1) a porous carbon buffer layer 15; (2) an inner pyrolytic carbon (PyC) layer 14; (3) a ceramic layer 13; and (4) an outer PyC layer 12.

The porous carbon buffer layer 15 surrounds the fuel kernel 11 and serves as a reservoir for accommodating buildup of fission gases diffusing out of the fuel kernel 11 and any mechanical deformation that the fuel kernel 11 may undergo during the fuel cycle.

The inner PyC layer 14 may be formed of relatively dense PyC and seals the carbon buffer layer 15.

The ceramic layer 13 may be formed of a SiC material and serves as a primary fission product barrier and a pressure vessel for the fuel kernel 11, retaining gaseous and metallic fission products therein. The ceramic layer 13 also provides overall structural integrity of the fuel particle 10.

In some embodiments, the SiC in the ceramic layer 13 may be replaced or supplemented with zirconium carbide (ZrC) or any other suitable material having similar properties as those of SiC and/or ZrC.

The outer PyC layer 12 protects the ceramic layer 13 from chemical attack during operation and acts as an additional diffusion boundary to the fission products. The outer PyC layer 12 may also serve as a substrate for bonding to the surrounding ceramic matrix 3.

The configuration and/or composition of the fuel particle 10 are not limited to the embodiments described above. Instead, it should be understood that a fuel particle consistent with the present disclosure may include one or more additional layers, or omit one or more layers, depending on the desired properties of the fuel particle. For example, in certain embodiments, the fuel particle is overcoated with an additional ceramic layer (i.e., SiC layer) prior to being mixed with the matrix material.

In particular embodiments, the ceramic matrix 3 includes SiC powder mixed with sintering additives and may be in a form of powder-based slurry, ceramic slurry for tape casting, or any other mixture type known in the art. Prior to the mixing, the fuel particles 10 may be coated with a suitable surface protection material. The SiC powder may have an average size of less than 1 μm and/or a specific surface area greater than 20 m$^2$/g. By way of example, the size of the SiC powder may range from about 15 nm to about 51 nm with the mean particle size being about 35 nm.

During or prior to mixing, sintering additives, such as, for example, alumina and rare earth oxides, for example $Y_2O_3$, may be added, individually or in combination, to the SiC powder and/or coated onto the SiC powder surface. In certain embodiments, the amount of sintering additives is up to 10 weight %, or, in more certain embodiments, from 6 weight % to 10 weight %. When mixing with the fuel particles 10, the SiC-based precursor material containing the SiC powder may be in a variety of physical states (e.g., powder, liquid, slurry, etc.) depending on the mixing and/or fabrication method used.

The small size or large specific surface area of the SiC powder, with the limited mass fraction of the sintering additives, may enable the formation of highly crystalline, near-full density, SiC matrix at conditions sufficient to ensure the integrity of the fuel particles 10. The SiC matrix provides an additional barrier to fission products that may be released during normal operation and accident temperatures and contaminate the coolant of the reactor. The SiC matrix also helps containing fission products after disposal.

Figure 3:
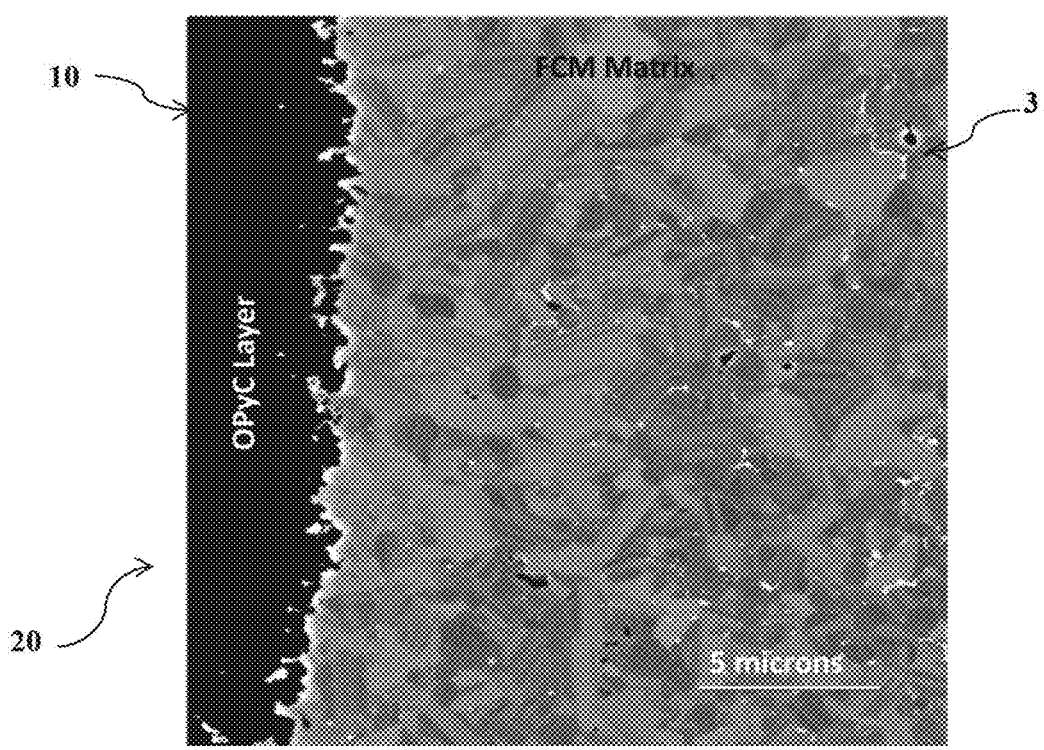
FIG. 3 is a SEM micrograph of a FCM microstructure produced by DCS.

For example, FIG. 3 shows a microscopic, partial cross-sectional view of a fuel element 20 fabricated with a method consistent with methods described herein. As can be seen from the figure, the fuel element 20 has very clean interfaces between the fuel particles 10 and the ceramic matrix 3. Further, the ceramic matrix 3 has a very low porosity (e.g., only about 3-4%/0 closed microporosity), forming a gas-impermeable barrier that acts as a secondary barrier to fission products/actinides diffusion and other radioactivity releases from the fuel particles 10.

In addition, the ceramic matrix 3 has very low permeability to helium (e.g., in the order of about $10^{-10}$ to $10^{-11}$ m$^2$/s), which is substantially lower than that of graphite and makes it particularly suitable for a gas cooled reactor that uses helium as a coolant. Low permeability of the ceramic matrix 3 may also ensure retention of fission product gas.

Additionally, a fuel element 1 produced according to methods descried herein have substantially higher thermal conductivity than that of the UO$_2$ fuel element. Higher thermal conductivity has many beneficial effects. For example, higher thermal conductivity may permit operating the nuclear reactor at higher temperature. Operating a reactor at higher temperature may increase the efficiency and the power density, which may permit reduction of the reactor size. Higher thermal conductivity may also permit higher burnup of the fuel element while maintaining the overall fuel integrity. Moreover, as briefly mentioned above, higher burnup may not only reduce the overall waste volume but also limit possible nuclear proliferation and diversion opportunities. Further, the fuel with high thermal conductivity may undergo less severe temperature transients during an accident condition, such as a loss of coolant accident (LOCA). In a light water reactor operating conditions, migration of fission products (including gases) outside the TRISO fuel particles and the SiC matrix is not expected to occur.

Further, the ceramic matrix 3 has higher fracture strength, higher irradiation resistance, and lower irradiation swelling than graphite or UO$_2$. Combination of better irradiation performance and better thermal conductivity may result in better mechanical performance as compared to graphite or UO$_2$ fuel element. In particular embodiments, the resulting ceramic matrix 3 is considered a near-stoichiometric, radiation-resistant, form of SiC, allowing the fuel element to be repository-stable for direct disposal even after substantial burnup (e.g., 60-99% burnup).

As mentioned above, previous methods for fabricating a fuel element comprising fuel particles and ceramic matrix included hot pressing a mixture of the fuel particles and ceramic matrix. For example, the mixture would be subjected to pressures close to, but not exceeding 10 MPa and temperatures close to, but not exceeding 1850° C. to attain a continuous, pore-free, large grained ceramic matrix surrounding TRISO particles which remain unbroken and intimately bonded with the external ceramic matrix. After hot pressing, the fuel element would be processed to obtain the final configuration. The processing typically included a centerless grinding step common to UO$_2$ process. Also, as mentioned above, the heterogeneous nature of the fuel element provides that the grinding step could undesirably expose a TRISO kernel.

In embodiments of the method described herein, further processing such as a grinding step is avoided by preparing a green body having the final configuration. The green body or unprocessed fuel element 1 illustrated in FIG. 1 includes the fuel particles 10 mixed with the ceramic matrix 3 within a ceramic fuel sleeve 2, which is illustrated as a tube. Note that other shapes are also suitable, such as a cylindrical pellet, sphere, or an elongated rod depending on the type and/or operational characteristics of the nuclear reactor in which the fuel element is intended to be used.

The ceramic fuel sleeve 2 may be fabricated from, as example, SiC of similar pedigree to the ceramic matrix or from nuclear grade graphite. Alternatively, the ceramic fuel sleeve may include SiC fibers or intermediate density green-bodies of nano-powder SiC. Where the ceramic fuel sleeve is an intermediate density green-body of nano-powder SiC, the nano-powder constituents would contain similar amounts of alumina and yttria as the ceramic matrix. In certain embodiments of the nano-powder SiC of the ceramic fuel sleeve, the SiC powder is somewhat larger than the SiC powder of the ceramic matrix to retard flow during sintering and thereby inhibiting movement of the TRISO through this outer wall.

The wall thickness of the ceramic fuel sleeve is determined from fuel structural and reactor neutronic considerations. In certain embodiments, the wall thickness is 0.5 mm or greater. Where more rigid structures are desired, the wall thickness may be increased up to as much as 2 mm. The use of the ceramic fuel sleeve helps eliminate the need for final machining.

The mixture of fuel particles 10 and ceramic matrix 3 may be uniform throughout or as a layered structure where the top and bottom layers of the mixture are free of fuel particles. An example of this layered structure is illustrated in FIG. 1 by reference number 3A referring to the central region of the green body or unprocessed fuel element 1 that contains fuel particles along with the ceramic matrix powder constituents and reference number 3B referring to top and bottom areas, which do not contain fuel particles. In certain embodiments, the nominal final thickness of the 3B layers is equal to or similar to the thickness of the wall thickness of the ceramic fuel sleeve. For example, the nominal thickness of the 3B layers is from 0.5 to 2 mm.

In certain embodiments, the 3B layers, if present, would function to be a layer having reduced amount of sintering aid for reactor coolant compatibility issues. The level of sintering aid may be as low as zero. In certain embodiments, the 3B layers, if present, function to provide added safety to the fuel by increasing the path length for migrating fission products to reach the free surface of the fuel.

The green body or unprocessed fuel element 1 is compacted by being placed in a multi-press resistive die block 4 for further fabrication. In FIG. 1, the multi-press resistive die block 4 contains multiple parallel openings for green bodies or unprocessed fuel elements 1. The die block being able to hold for compression multiple green bodies or unprocessed fuel elements 1 simultaneously significantly reduces processing time by allowing parallel sample processing. For example, the total run time for production of fuel elements utilizing embodiments of the methods disclosed herein is less than an hour. In certain embodiments, the total run time is less than 45 minutes. In yet more certain embodiments, the total run time is no more than 35 minutes. Additionally, by holding for compression multiple green bodies or unprocessed fuel elements in parallel openings in a single die, identical fuel consistent with mass production. In particular embodiments, the die block is formed of graphite.

After loading the multi-press resistive die block 4, it is placed within a direct current sintering system (DCS). The DCS, similar in function to a spark plasma sintering system (SPS), passes a current through the die block 10 and to a less extent the green bodies or unprocessed fuel elements 1 rapidly achieving target temperature in a controlled manner.

In particular embodiments, the DCS parameters are controlled to obtain a fuel element with 3.22 g/cc envelope density (near theoretical). One such parameter includes the die displacement, which includes the relative first expanding with the thermal expansion of the cold pressed powder and then contracting as the sintering process begins. In the method, the total die displacement is dependent on the initial cold press density and the final product is found to be near theoretical over a wide range of initial cold-press powder densities. For this reason, in certain embodiments, an initial cold-pressure of 5-10 MPa is chosen to avoid disruption of the ceramic shell of the TRISO particle. Another parameter includes the temperature ramp. In the prior hot-press methods, the temperature ramp is approximately 10° C./min. However, the DCS processing can achieve identical matrix microstructure and near-theoretical density with compact heat rates greater than 10° C./min. For example, the heat rate can be greater than 40, 50, or 70° C./min, and less than 200, 180, 160, or 150° C./min. In particular embodiments, the temperature ramp or heat rate is between 70 and 150° C./min. Yet another embodiment is the hold temperature during DCS processing. In certain embodiments, the hold temperature is from 1650 to 1900° C., or 1700 to 1800° C. in more particular embodiments.

EXAMPLE

Figure 2:
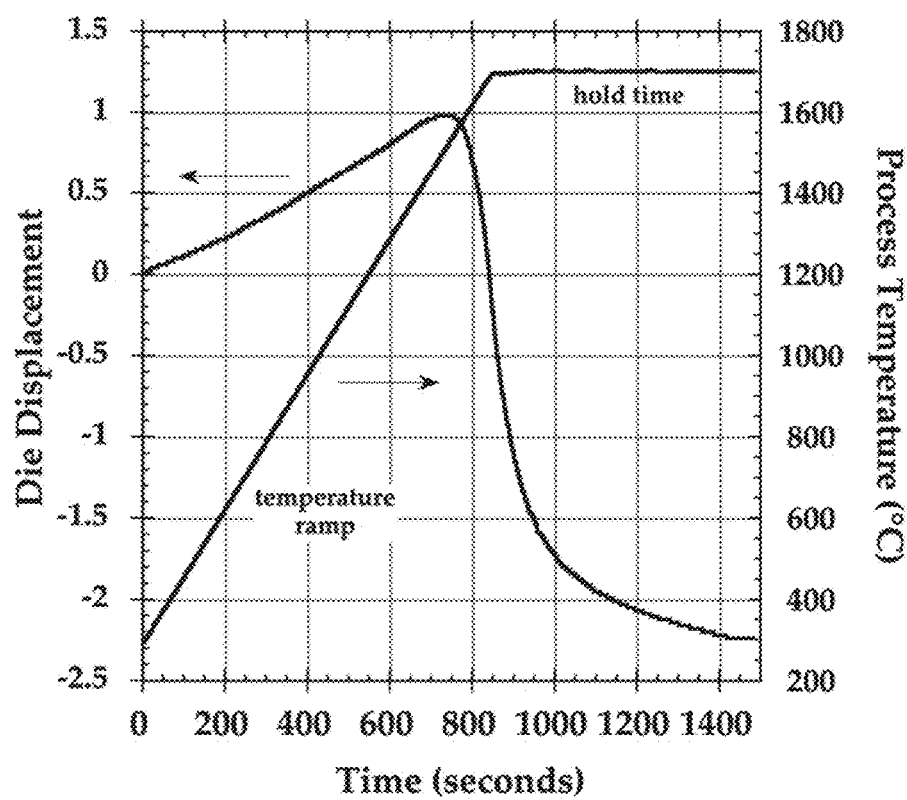
FIG. 2 is a graph illustrating results of surrogate FCM compacted using a direct current sintering (DCS) process.

FIG. 2 provides the temperature ramp and die displacement for a representative fuel that achieved 3.22 g/cc envelope density (near theoretical.) In this run a process temperature of 1700° C. was chosen with a hold time of 10 minutes while applying 5 MPa load. Total run time, including removal and cooling of the FCM part was 35 minutes, which favorably compares to several hours for the production of hot-pressed FCM.

Although illustrated in separate figures, any features illustrated and described within one figure or embodiment could be substituted or added to any of the other embodiments described above.

Although described in connection with preferred embodiments thereof, it will be appreciated by those skilled in the art that additions, deletions, modifications, and substitutions not specifically described may be made without departure from the scope of the invention as defined in the appended claims.

What is claimed is:

1. A method comprising:
   providing a plurality of tristructural-isotropic fuel particles;
   mixing the plurality of tristructural-isotropic fuel particles with ceramic powder to form a mixture;
   placing the mixture in a die; and
   applying a current to the die so as to sinter the mixture by direct current sintering into a fuel element.

2. The method according to claim 1, further comprising adding the mixture to a ceramic fuel sleeve prior to placing the mixture in the die, wherein placing the mixture in the die includes placing the ceramic fuel sleeve containing the mixture in the die.

3. The method according to claim 2, wherein the ceramic fuel sleeve comprises silicon carbide (SiC).

4. The method according to claim 2, wherein the ceramic fuel sleeve comprises the same composition as the ceramic powder.

5. The method according to claim 1, wherein the die includes more than one parallel opening and the method includes placing a mixture of the plurality of tristructural-isotropic fuel particles with ceramic powder in each of the openings.

6. The method according to claim 2, wherein the die includes more than one parallel opening and the method includes placing a ceramic fuel sleeve containing a mixture of the plurality of tristructural-isotropic fuel particles with ceramic powder in each of the openings.

7. The method according to claim 6, wherein the die comprises graphite.

8. The method according to claim 1, wherein the fuel element has a precise outer part dimension following the sintering process, with no additional processing occurring after the sintering process to obtain the precise outer part dimension.

9. The method according to claim 1, wherein the ceramic powder comprises silicon carbide (SiC).

10. The method according to claim 9, wherein the ceramic powder further comprises sintering additives.

11. The method according to claim 10, wherein the sintering additives comprise alumina or a rare earth metal oxide or a combination thereof.

12. The method according to claim 11, wherein the rare earth metal oxide is yttria.

13. The method according to claim 10, wherein the ceramic powder includes the sintering additives in an amount up to 10 weight percent of the total weight of the ceramic powder.

14. The method according to claim 9, wherein the fuel element comprises near stoichiometric SiC.

15. The method according to claim 14, wherein a total run time for forming the fuel element is less than an hour.

16. A method comprising:
   providing a plurality of tristructural-isotropic fuel particles;
   mixing the plurality of tristructural-isotropic fuel particles with ceramic powder to form a continuous ceramic matrix surrounding the plurality of tristructural-isotropic fuel particles;
   placing the continuous ceramic matrix surrounding the plurality of tristructural-isotropic fuel particles in a die; and
   applying a current to the die so as to sinter the continuous ceramic matrix surrounding the plurality of tristructural-isotropic fuel particles by direct current sintering into a fuel element.

* * * * *